United States Patent Office

2,848,506
Patented Aug. 19, 1958

2,848,506

PREPARATION OF CYCLOPENTADIENYLSODIUM

David S. Breslow, New Castle County, Del., assignor to Hercules Powder Company, Wilmington, Del., a corporation of Delaware No Drawing. Application April 29, 1954
Serial No. 426,605

8 Claims. (Cl. 260—665)

This invention relates to a process of preparing cyclopentadienylsodium and alkyl-substituted cyclopentadienylsodium compounds, and more particularly to the preparation of these compounds by the reaction of sodium with cyclopentadiene or an alkylcyclopentadiene.

Cyclopentadienylsodium is an important product for use in the synthesis of various materials and is especially useful in the synthesis of bis(cyclopentadienyl)iron. Cyclopentadienylpotassium has been prepared by reacting cyclopentadiene with potassium in benzene as the reaction medium, but sodium, under the same conditions, failed to react and no compound with cyclopentadiene was formed. In fact, it has previously been believed that sodium would react with cyclopentadiene only to dimerize or polymerize the cyclopentadiene.

Now, in accordance with this invention, it has been found that sodium in the form of metallic sodium or a compound of sodium having a greater basicity than sodium hydroxide will react with cyclopentadiene or an alkyl-substituted cyclopentadiene to form cyclopentadienylsodium or the corresponding alkylcyclopentadienylsodium if the reaction is carried out in an organic liquid diluent that is a solvent for cyclopentadienylsodium.

The following examples will illustrate the process of preparing these cyclopentadienylsodium compounds in accordance with this invention and the use of these products in the synthesis of other compounds. All parts and percentages are by weight unless otherwise indicated.

*Example 1*

Five parts of sodium was extruded through a die having holes 1 mm. in diameter into 200 parts of anhydrous tetrahydrofuran. Twenty-five parts of cyclopentadiene was then gradually added and spontaneous reaction took place, the sodium wire disappearing. During this reaction the mixture was maintained at a temperature of about 30° C. and was protected from air by a stream of nitrogen which was released close to the surface of the solution.

The above solution of cyclopentadienylsodium in tetrahydrofuran was then used to prepare bis(cyclopentadienyl)iron by adding 20 parts of anhydrous ferric chloride in 100 parts of tetrahydrofuran to the vigorously agitated solution, the temperature being held at 30–50° C. during the addition. The reaction mixture was then poured into ice water which had been acidified with hydrochloric acid. A dark blue solution resulted, together with a granular product. The latter, which was partly bis(cyclopentadienyl)iron, was separated by filtration. The blue filtrate containing ferricinium chloride was warmed to 50° C. and the ferricinium ion reduced with stannous chloride. The bis(cyclopentadienyl)iron separated as a yellow suspension and was isolated by filtration. It was combined with that separated by the first filtration and was purified by sublimation at atmospheric pressure whereby orange crystals melting at 172° C. were obtained.

*Example 2*

Sodium (5.75 parts) in the form of a dispersion (50% in toluene) was suspended in 100 parts of tetrahydrofuran. To this suspension was then added 27 parts of cyclopentadiene whereupon there was produced a clear red solution of cyclopentadienylsodium.

This solution of cyclopentadienylsodium is tetrahydrofuran was added slowly to a solution of 14 parts of ferric chloride in 100 parts of tetrahydrofuran. The reaction mixture was then poured into ice water acidified with hydrochloric acid. There was formed an aqueous phase and a smaller oily phase. The latter was shaken with water whereby it was converted to a yellowish granular mass bearing some bis(cyclopentadienyl)iron. This was removed by extracting repeatedly with ether. The combined ether extracts were washed with dilute sodium carbonate solution, then with water, and finally were dried over sodium sulfate. On removal of the ether there was produced 14.2 parts of bis(cyclopentadienyl)iron. The blue aqueous phase remaining after the separation of the oily phase was reduced with 35 parts of stannous chloride. The bis(cyclopentadienyl)iron recovered thereby amounted to 2 parts.

*Example 3*

Twelve parts of sodium in the form of sodium sand was suspended in 200 parts of anhydrous ethylene glycol dimethyl ether (1,2-dimethoxyethane). To this suspension was added 64 parts of cyclopentadiene in small portions, the temperature of the reaction being maintained at 30–40° C. by the exothermic reaction which took place until the addition was complete. The reaction mixture was then refluxed until all of the sodium had reacted and a clear solution was formed. On cooling, a crystalline precipitate of cyclopentadienylsodium separated.

*Example 4*

Sodium methoxide was prepared by slowly adding 32 parts of methanol to an agitated suspension of 46 parts of a 50% sodium dispersion in toluene in 500 parts of anhydrous tetrahydrofuran. Ninety-two parts of cyclopentadiene was then slowly added to the agitated suspension of sodium methoxide in tetrahydrofuran, the reaction mixture being blanketed with nitrogen throughout the process.

The solution of cyclopentadienylsodium obtained above was then used to prepare bis(cyclopentadienyl)iron by adding it slowly to 60 parts of ferric chloride in 150 parts of tetrahydrofuran. When the addition was complete, the solvent was removed from the reaction mixture by distillation. The dry residue was extracted with hexane to remove the bis(cyclopentadienyl)iron and the latter was then isolated by removal of the hexane.

*Example 5*

Six parts of sodium hydride was suspended in 100 parts of anhydrous tetrahydrofuran. To this mixture, under a nitrogen atmosphere, was added slowly 25 parts of cyclopentadiene. A vigorous reaction took place. After it had subsided, a clear solution resulted. To this solution of cyclopentadienylsodium in tetrahydrofuran was added 40 parts of ferric chloride in 100 parts of tetrahydrofuran. The bis(cyclopentadienyl)iron was isolated by pouring the reaction mixture into acidified ice water and reducing the blue aqueous solution with stannous chloride in the same manner as described in Example 1.

*Example 6*

To an agitated suspension of 19.5 parts of sodamide in 180 parts of tetrahydrofuran was added 36 parts of cyclopentadiene, the temperature being held at 20°–25° C. during the addition. The solution of cyclopentadienylsodium was then chilled and freshly powdered Dry Ice was added until an excess of the amount required to react with the cyclopentadienylsodium was present. After standing for 16 hours, the reaction mixture was filtered and the precipitate was washed with ether, air-dried, and finally was dissolved in water. The cyclopentadienyl-carboxylic acid was precipitated from the aqueous solution by acidification with dilute sulfuric acid and separated by filtration. After washing with water and drying there was obtained 41.3 parts (75% of the theoretical amount) of the dimer of cyclopentadienylcarboxylic acid. It had an acid number of 505 (calculated 508).

*Example 7*

Cyclopentadiene (39 parts) was added to an agitated suspension of 23 parts of a 50% sodium dispersion (in toluene) in 150 parts of tetrahydrofuran, the temperature being held at 30°–40° C. by cooling during the addition. A red solution of cyclopentadienylsodium in the tetrahydrofuran was formed. A portion of it (21.5 parts) was poured onto Dry Ice and the resulting acid was isolated as described in Example 6. The cyclopentadienylcarboxylic acid so obtained amounted to an 89% yield based on the sodium used.

*Example 8*

Cyclopentadienylsodium was prepared by adding 3.3 parts of cyclopentadiene to a suspension of 0.78 part of sodamide in 50 parts of dimethylformamide. A cloudy red solution was formed. To it was added 13 parts of anhydrous ferrous chloride as a dark brown slurry in 50 parts of dimethylformamide. After agitating for 30 minutes, the reaction mixture was poured into dilute aqueous hydrochloric acid. The blue color in the aqueous mixture was discharged by the addition of stannous chloride and the precipitate was removed by filtration and extracted with hexane. On cooling and filtering the hexane solution, there was obtained 1.44 parts of bis(cyclopentadienyl)iron, which amount was equal to a 77% yield based on the sodamide.

*Example 9*

A suspension of sodium tert-butoxide in tert-butyl alcohol was prepared by refluxing 235 parts of tert-butyl alcohol containing 11.5 parts of sodium. To this was then added slowly 36 parts of cyclopentadiene at room temperature. The resulting cyclopentadienylsodium in tert-butyl alcohol was agitated and to it was added 32 parts of anhydrous ferrous chloride. The reaction mixture was agitated at room temperature for 4 hours and then allowed to stand for 16 hours. After pouring into a dilute aqueous solution of hydrochloric acid, the solid was filtered off, dried, and extracted with hexane. The bis(cyclopentadienyl)iron was obtained as a crystalline solid by chilling the extract and removing it by filtration. The hexane was removed from the filtrate and the residue sublimed to obtain an additional amount of the product.

*Example 10*

A solution of cyclopentadienylsodium in tetrahydrofuran was prepared by adding 40 parts of cyclopentadiene to a suspension of 23 parts of a 50% sodium dispersion (in toluene) in 150 parts of tetrahydrofuran. To the cyclopentadienylsodium solution was then added a solution of 71 parts of methyl iodide in 100 parts of tetrahydrofuran. A spontaneous reaction took place and a white precipitate of sodium iodide formed. After agitating for 15 minutes, the precipitated sodium iodide was removed by filtration. The solution of methylcyclopentadiene in tetrahydrofuran so obtained was then added to a suspension of 20 parts of a 50% sodium dispersion (in toluene) in 70 parts of tetrahydrofuran. An exothermic reaction took place and hydrogen was evolved. To the solution of methylcyclopentadienylsodium so obtained was added 11 parts of anhydrous ferrous chloride in 40 parts of tetrahydrofuran, an exothermic reaction taking place. The reaction mixture was then treated with 50 parts of methanol to destroy any unreacted sodium or sodio compounds and the solvents were removed by distillation. The residue was then extracted with hexane. The hexane solution on distillation yielded a deep red liquid boiling at 70°–80° C. at 2 mm. On analysis it was found to contain 24.7% iron (theory for bis(methylcyclopentadienyl)iron is 26.1%).

The process of preparing cyclopentadienylsodium, or alkyl-substituted derivatives thereof, in accordance with this invention involves the reaction of sodium or a sodium compound, having a basicity greater than that of sodium hydroxide, with cyclopentadiene or an alkylcyclopentadiene in a liquid organic reaction medium in which the cyclopentadienylsodium compound that is produced is soluble. Cyclopentadiene or any mono- or di-alkylcyclopentadiene having at least one hydrogen attached to the methylene carbon in the cyclopentadiene ring, i. e., to the 5-position, may be reacted with sodium by the process of this invention. Exemplary of the cyclopentadienes that may be so reacted with sodium are cyclopentadiene, the 1-, 2-, and 5-methylcyclopentadienes, the 1,2-; 1,3-; 1,4-; 1,5-; 2,3-; and 2,5-dimethylcyclopentadienes and the corresponding mono- and di-ethyl, propyl, isopropyl, butyl, isobutyl, amyl, hexyl, heptyl, octyl, etc., derivatives and the mixed dialkylcyclopentadienes such as 1-methyl-2-ethylcyclopentadiene, etc. Thus, there may be used any cyclopentadiene having the formula

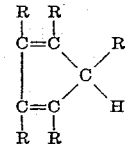

where at least three of the R's are H and the remaining two may be H or alkyl and when both are alkyl, may be alike or different. The alkyl radicals may be any alkyl group but preferably will be alkyl groups containing from 1 to 8 carbon atoms.

Any form of metallic sodium may be used, as, for example, sodium wire, sodium sand, sodium dispersions, sodium amalgam, etc., when the reaction is carried out in accordance with this invention in a solvent for the product. Another form of sodium that may be used for the reaction with cyclopentadiene or the alkylcyclopentadienes when the reaction medium is one in which the cyclopentadienylsodium compound is soluble is that of compounds of sodium which are stronger bases than sodium hydroxide, as, for example, compounds such as sodium hydride, sodium alkoxides as, for example, sodium ethoxide, sodium methoxide, sodium tert-butoxide, etc., sodium amide, etc.

As pointed out above, the reaction in accordance with this invention is carried out in any organic liquid reaction medium in which the cyclopentadienylsodium compound which is produced is soluble and which diluent is inert under the conditions of the reaction. Thus while some solvents in which the cyclopentadienylsodium is soluble might not be inert to metallic sodium, they may be inert to a sodium compound and can be used as diluents for the latter reaction. An example of such a case is dimethylformamide which reacts with sodium and hence cannot be used for the reaction of cyclopentadiene with metallic sodium but, as may be seen from Example 8, is an excellent diluent for the preparation of cyclopentadienylsodium by the reaction of cyclopentadiene and a sodium compound such as sodium amide. In the same way, formals and acetals, that may be good solvents for the cyclopentadienylsodium compound, might not be inert to sodium but would be inert to sodium alkoxides and hence could be used for the reaction of cyclopentadiene with a sodium alkoxide. Another case that may be mentioned is the use of tert-butyl alcohol, where metallic sodium reacts with the alcohol to form sodium tert-butoxide, and the reaction that takes place is again that of the cyclopentadiene and a sodium compound. Hence the organic diluent that is used may be defined as a solvent for the cyclopentadienylsodium compound being produced and which is inert under the conditions of the reaction, i. e., does not interfere with the reaction. Obviously the more soluble the cyclopentadienyl compound is in the diluent at the temperature at which the reaction is carried out, the more readily the reaction takes place. In general, the cyclopentadienylsodium compound should have a solubility of at least about 0.5% and preferably at least about 1% in the inert organic diluent. Exemplary of the organic solvents that may be used for the reaction of the cyclopentadiene with sodium and/or a sodium compound are tetrahydrofuran, 1,2-dimethoxyethane, dimethyl ether, ethylene glycol formal, tert-butyl alcohol, formamide, dimethylformamide, etc., and mixtures of such diluents or of them with other organic liquids that may not be solvents for the cyclopentadienylsodium compound, as, for example, with hydrocarbon diluents such as hexane, isooctane, cyclohexane, toluene, etc., excess cyclopentadiene or other olefin, tertiary amines, sulfides, ethers such as diethyl ether, dioxane, etc., provided that the combination of solvents is still a solvent for the cyclopentadienylsodium compound being produced.

The reaction may be carried out at any convenient temperature, and room temperature is frequently used if the diluent that is used is liquid at room temperature. In the case of diluents having boiling points at or below room temperature, the reaction must be carried out at lower temperatures at which the diluent remains liquid or the reaction must be carried out under pressure. Temperatures above room temperature may be used, and particularly if the reaction is carried out in the absence of oxygen, but if the temperature is above the boiling point of the cyclopentadiene being reacted, it will be necessary to carry out the reaction under pressure to prevent loss of the cyclopentadiene. In general, the reaction will be carried out at a temperature of from about −20° C. to about 150° C. and preferably from about 0° C. to about 80° C.

Since the reaction here involved is one between 1 mole of sodium or sodium ion and 1 mole of cyclopentadiene, a mole to mole ratio of reactants is adequate, but usually an excess of the cyclopentadiene compound will be used since the latter is the less expensive of the two reactants.

The solution of cyclopentadienyl sodium compound obtained in accordance with this invention may be used as such for the synthesis of other materials such as bis(cyclopentadienyl)iron, cyclopentadienylcarboxylic acid, etc. If the solid crystalline product is desired, it may readily be obtained by removal of the solvent by distillation, etc.

What I claim and desire to protect by Letters Patent is:

1. The process of preparing a cyclopentadienylmonosodium compound which comprises reacting one of the group consisting of cyclopentadiene and alkylcyclopentadienes wherein the cyclopentadienyl radical contains from 1 to 2 alkyl substituents with one of the group consisting of sodium and sodium compounds more basic than sodium hydroxide in an inert liquid organic diluent in which the cyclopentadienylsodium compound is soluble, said diluent being selected from the group consisting of tetrahydrofuran, dimethylformamide, and tert-butyl alcohol.

2. The process of preparing cyclopentadienylsodium which comprises reacting sodium with cyclopentadiene in an inert liquid organic diluent that is a solvent for cyclopentadienylsodium, said diluent being selected from the group consisting of tetrahydrofuran, dimethylformamide, and tert-butyl alcohol.

3. The process of preparing cyclopentadienylsodium which comprises reacting a sodium compound more basic than sodium hydroxide with cyclopentadiene in an inert liquid organic diluent in which the cyclopentadienylsodium is soluble, said diluent being selected from the group consisting of tetrahydrofuran, dimethylformamide, and tert-butyl alcohol.

4. The process of preparing a monoalkylcyclopentadienylsodium which comprises reacting sodium with a monoalkylcyclopentadiene in an inert liquid organic diluent that is a solvent for the alkylcyclopentadienylsodium, said diluent being selected from the group consisting of tetrahydrofuran, dimethylformamide, and tert-butyl alcohol.

5. The process of preparing cyclopentadienylsodium which comprises reacting sodium with cyclopentadiene in tetrahydrofuran.

6. The process of preparing cyclopentadienylsodium which comprises reacting a sodium alkoxide with cyclopentadiene in tetrahydrofuran.

7. The process of preparing cyclopentadienylsodium which comprises reacting sodium amide with cyclopentadiene in dimethylformamide.

8. The process of preparing methylcyclopentadienylsodium which comprises reacting sodium with methylcyclopentadiene in tetrahydrofuran.

References Cited in the file of this patent

UNITED STATES PATENTS

| | | |
|---|---|---|
| 2,183,847 | Scott | Dec. 19, 1939 |
| 2,454,082 | Morton | Nov. 16, 1948 |
| 2,563,074 | Schmerling | Aug. 7, 1951 |
| 2,716,662 | Cohen et al. | Aug. 30, 1955 |
| 2,777,887 | Weinmayr | Jan. 15, 1957 |

OTHER REFERENCES

Thiele: Berichte, vol. 34, pages 68–71 (1901).

Taylor et al.: Journal of Organic Chemistry, vol. 6, April 19, 1941, pages 696–704.

Handling Sodium in Organic Reactions, Hansley, Ind. and Eng. Chem., vol. 43, No. 8, August 1951, pages 1759 to 1766.